United States Patent [19]

Dittner

[11] Patent Number: 4,717,211

[45] Date of Patent: Jan. 5, 1988

[54] METHOD AND APPARATUS FOR THE ANTI-LOCKING BRAKING OF AN AUTOMOTIVE VEHICLE

[75] Inventor: Adam Dittner, Höchstadt, Fed. Rep. of Germany

[73] Assignee: FAG Kugelfischer Georg Schafer (KGa), Fed. Rep. of Germany

[21] Appl. No.: 899,208

[22] Filed: Aug. 21, 1986

[30] Foreign Application Priority Data

Aug. 24, 1985 [DE] Fed. Rep. of Germany ....... 3530280

[51] Int. Cl.⁴ ................................................ B60T 8/60
[52] U.S. Cl. ....................................... 303/119; 303/61
[58] Field of Search ............... 188/349, 181 A, 181 R; 303/61, 103, 113, 115, 119

[56] References Cited

U.S. PATENT DOCUMENTS

| | | | |
|---|---|---|---|
| 3,574,417 | 4/1971 | Howard et al. | 303/61 X |
| 3,617,098 | 11/1971 | Leiber | 303/61 X |
| 4,138,165 | 2/1979 | Blomberg et al. | 303/61 X |
| 4,275,934 | 6/1981 | MacDonald | 303/119 |

*Primary Examiner*—Duane A. Reger
*Attorney, Agent, or Firm*—Ostrolenk, Faber, Gerb & Soffen

[57] ABSTRACT

A wheel braking cylinder and an expandable chamber of a pressure modulator are connected in a spatially closed arrangement that is connected to an operator controlled master cylinder, with the chamber being interposed between the braking and master cylinders. When vehicle deceleration reaches an upper threshold, an electromagnet is actuated and the armature thereof operates to isolate the master cylinder from the chamber and expands the chamber to reduce pressure in the braking cylinder, thereby reducing deceleration. When deceleration reaches a lower threshold the electromagnet is de-energized so that force generated by the armature biasing spring acts to reduce the chamber volume, thereby increasing pressure in the braking cylinder.

6 Claims, 4 Drawing Figures

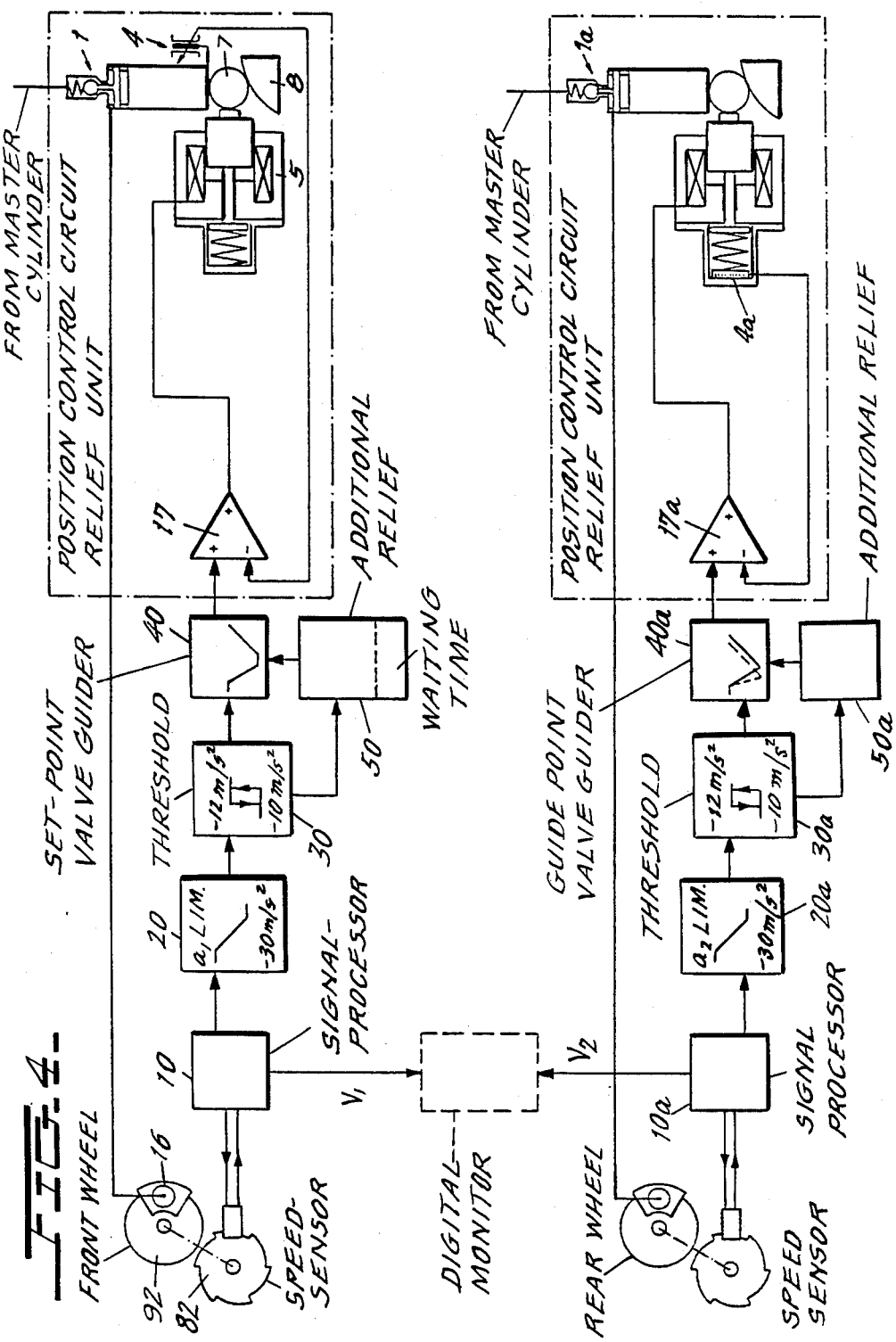

METHOD AND APPARATUS FOR THE ANTI-LOCKING BRAKING OF AN AUTOMOTIVE VEHICLE

CROSS REFERENCE TO RELATED APPLICATION

This application is related to co-pending application Ser. No. 899,201 filed on Aug. 21, 1986, entitled "Electromagnetically Actuatable Pressure Modulator" by Adam Dittner et al., and assigned to the same assignee as the present application.

BACKGROUND OF THE INVENTION

This invention relates to automotive braking systems in general, and more particularly relates to a method and apparatus for the anti-locking braking of an automotive vehicle, particularly a motorcycle.

The Federal Republic of Germany Pat. No. 31 19 144 discloses an anti-locking braking system that includes an electronic section which recognizes overbraking of the wheel upon circumferential deceleration reaching 12 m/s$^2$ and, by means of a hydraulically controlled pressure modulator, interrupts the connection between an operator actuated master cylinder and the wheel cylinder to reduce braking pressure acting on the wheel cylinder. Braking pressure is then reduced by increasing the volume in a chamber of the pressure modulator until a lower circumferential deceleration threshold of 10 m/s$^2$ is reached, whereupon an exactly defined further reduction of the braking force takes place in an amount calculated from the moment of inertia of the rotating wheel, which leads to a reduced deceleration of the braked wheel. This is followed by a reduction in volume of the chamber resulting in increasing brake pressure so that circumferential deceleration of the wheel rises and upon reaching 12 m/s$^2$ again, a new control cycle commences.

The change in volume of the pressure modulator chamber is effected by a stepped piston which is arranged in the modulator to form equalization and working chambers which are separated from each other. The equalization chamber is connected to the brake cylinder and the working chamber is connected to the brake cylinder by a servo valve, a hydraulic circuit which is formed of a motor-driven pump with non-return valve behind it, and a pressure accumulator connected in parallel therewith.

Upon over-braking of the wheel, the servo valve is so displaced that pressure built up in the working chamber of the pressure modulator pushes the stepped piston toward a lower dead center position, as a result of which the equalization chamber is enlarged and the active brake pressure in the wheel cylinder is reduced. For increasing the braking force, the servo valve switches in such a manner that hydraulic fluid can flow from the working chamber into the tank, while the stepped piston is pushed by spring force toward an upper dead center.

An anti-locking device which operates in accordance with this method was developed for use in two-track (at least four wheels) vehicles and cannot be integrated practically in motorcycles since the hydraulic circuit with its numerous parts requires a large amount of space and because handling properties would be negatively influenced by the necessarily increased weight of the vehicle.

SUMMARY OF THE INVENTION

The primary objective of this invention is to provide a method and apparatus for anti-locking braking of an automotive vehicle, particularly a motorcycle, by utilizing an electronic system of the type disclosed in Federal Republic of Germany Pat. No. 31 19 144, and without having to tolerate previously noted disadvantages of the prior art.

That is, according to the instant invention, over-braking protection is achieved by utilizing a spatially closed system, which is separated from the hydraulic pressure circuit, to control braking pressure in the wheel cylinder by changing the volume of the system. A spatially closed system is defined as a system which is formed by the volumes of brake cylinder and pressure modulator chamber which are continuously connected to each other, and on which no force can act from the outside, and the volume of which can be altered only by utilizing electrical energy. Prior art systems are not spatially closed.

In Federal Republic of Germany Pat. No. 31 19 144, force applied from the outside, by a pump of a pressure accumulator, acts on a stepped piston of a pressure modulator and the increase in the volume is achieved by the feeding of hydraulic energy. In a magnetically actuated modulator device in accordance with Federal Republic of Germany Pat. No. 26 48 042, the volumes of brake cylinder and modulator are not continuously connected to each other.

As will be seen hereinafter, an electromagnetically actuatable pressure modulator is provided with a pressure relief piston that is operatively connected with the armature of an electromagnet. This connection may be by way of a variable lever transmission to achieve a linear force that acts on the pressure relief piston, which linear force is derived from the non-linear force of displacement of the magnet armature.

BRIEF DESCRIPTION OF THE DRAWINGS

This invention will now be described in detail with reference to the accompanying drawings, in which:

FIG. 4 is a system block diagram of the anti-locking device constructed in accordance with the instant invention.

DESCRIPTION OF THE PREFERRED EMBODIMENTS

Figure 1:
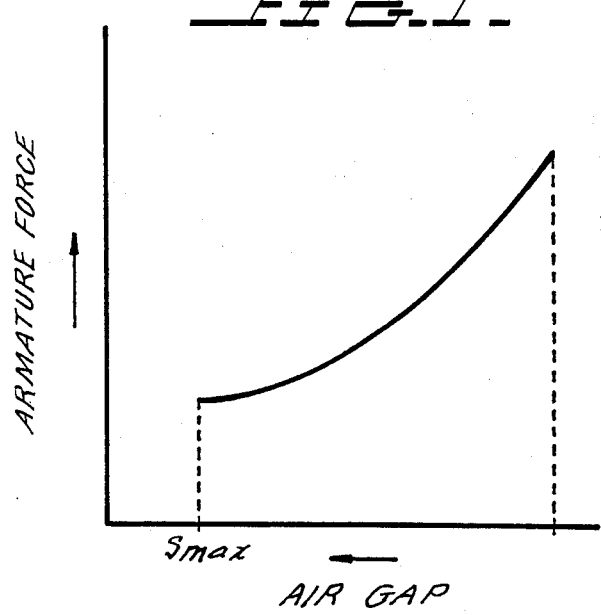
FIG. 1 is a force/air gap diagram of an electromagnet.

From FIG. 1 it is seen that the displacement force F of the armature 6 (FIG. 3) for compact electromagnet 5 does not change linearly with respect to air gap S. It has been found that in order to obtain superior performance of a braking system having a pressure modulator 1, it is necessary to achieve a controlled and reproducible buildup and decrease in brake pressure. That is, the force on the pressure relief piston 2 of pressure modulator 1 should vary linearly with the change in volume of modulator chamber 14 that is controlled by the displacement of piston 2.

Figure 2:
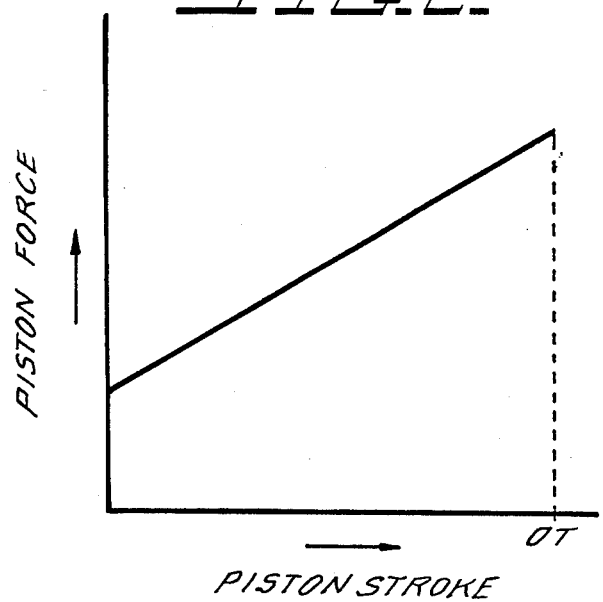
FIG. 2 is a diagram of the required variation of the force with respect to the volume of a chamber controlled by the pressure relief piston.

A linear force/displacement characteristic (FIG. 2) for piston 2 is obtained by interposing variable lever or force transmission means, consisting of roller 7 riding on cam 8, between armature 6 and piston 2. Cam 8 acts as a variable lever by being developed as a curved surface whose slopes are so dimensioned that the course of the non-linear force-displacement characteristic of armature 6 (FIG. 1) is converted into the course of the linear force/displacement force characteristic of the piston 2.

Modulator 1 also includes body 99 having bore 98 wherein piston 2 is slidably mounted. Chamber 14 is that portion of bore 98 above piston 2. Above bore 98, body 99 is also provided with cavity 97 wherein ball valve 3 and compression spring 96 are disposed. Inlet 95 connects cavity 97 to the upper end of bore 98 and spring 96 biases valve 3 toward its closed position wherein inlet 95 is closed. Hydraulic line 94 connects master cylinder 15 to cavity 97 and hydraulic line 93 connects chamber 14 to brake 16, the latter being engageable with rotating wheel 92 for stopping rotation thereof.

Roller 7 engages the bottom of cylinder 2 and extension 91 at the left end of armature 6, the latter being disposed to move at right angles to the path of movement for cylinder 2. Enlargement 89 at the free end of elongated projection 88 that extends from the right end of armature 6 is engaged by one end of compression spring 9 disposed within housing 87. The latter is fastened to stationary field piece or core 86 of magnet 5. Magnet coil 12 is connected to the output of comparator 17 which has one input connected to the output of set points value guide or generator 40, and has another input that is connected to the output of position monitoring device 4 whose input is driven by piston 2. When braking is not taking place, piston 2 is in the upper dead center position of FIG. 3 wherein piston projection 84 extends upward through inlet 95 and engages valve 3 to open same.

The initial force of compression spring 9 is selected so that piston 2 is only displaceable in the direction of its lower dead center position if the hydraulic pressure force acting on cylinder 2 is approximately the maximum braking force which leads to the locking of wheel 92 (for instance with a braking pressure of 60 bar).

When armature 6 is attracted by the excitation of the coil 12, the equalization chamber or space 14 is increased in size, master cylinder 15 is disconnected from the wheel cylinder 16 by means of ball valve 3, and the effective brake pressure in wheel cylinder 6 is reduced. An increase in the braking force takes place in the corresponding reverse manner. This cycle takes place within the above-described circumferential deceleration thresholds of 12 m/s² and 10 m/s², respectively, until the vehicle has come to a stop or until the braking pressure generated by master cylinder 15 is below the locking pressure of the wheel 92.

Position measuring system 4 driven by piston 2 applies a continuously increasing or decreasing "actual" signal, corresponding to the change in volume of chamber 14, to one input of comparator 17, which compares it with the set point signal given off by the electronic system (FIG. 4) of which set point value guider 40 is a part.

Position measuring system 4 may be replaced by piezoquartz element 4a (FIG. 3) disposed behind the compression spring 9. Force applied to element 4a is related to the volume of chamber 14. Hence, signals generated by force applied to element 4a and fed to an input of comparator 17 are indicative of the position of piston 2. The advantage of using piezoquartz element 4a is that, as a passive element, no electric energy need be fed to it from the outside.

Figure 3:
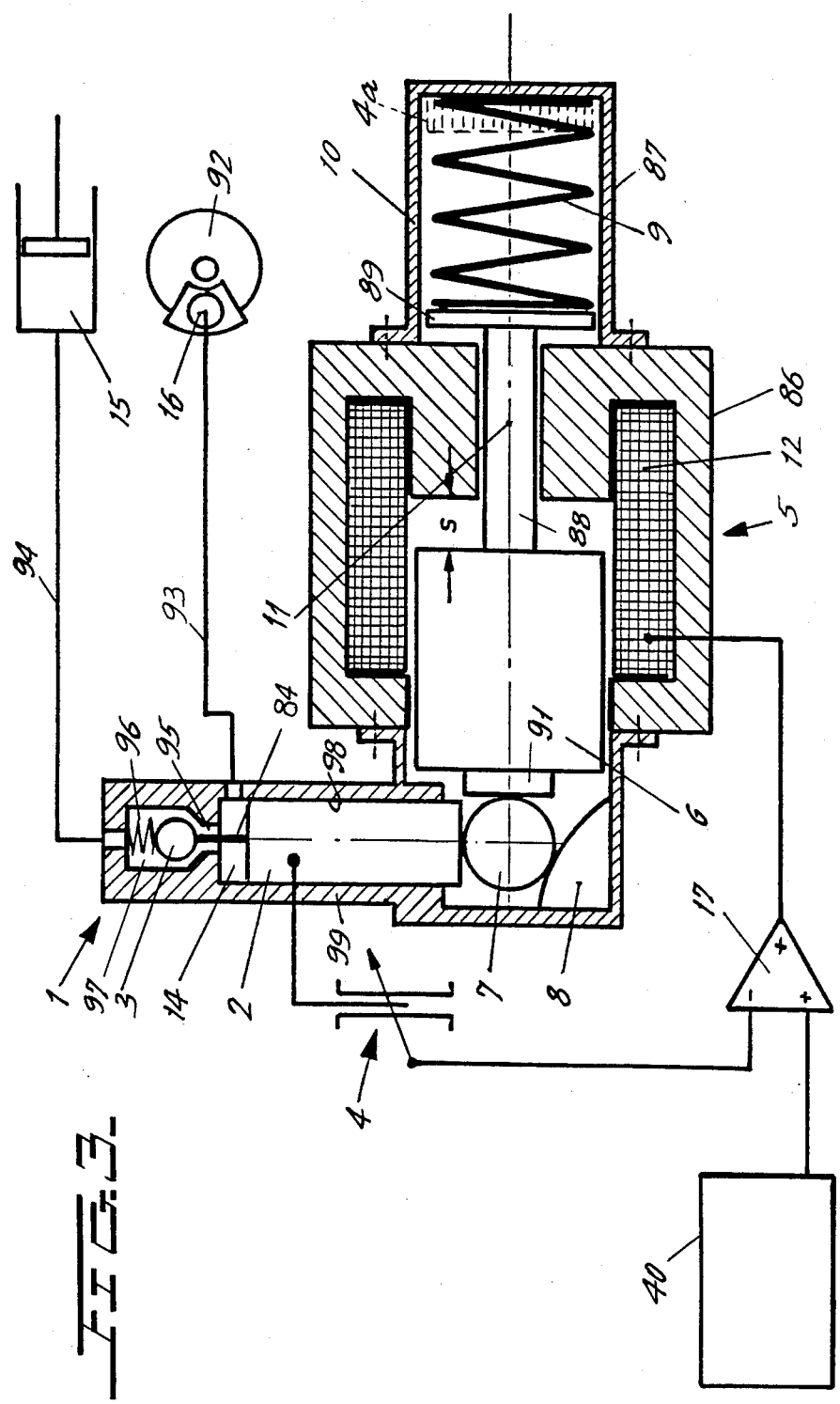
FIG. 3 is a longitudinal section through an electromagnetically actuatable pressure modulator.

Now referring more particularly to FIG. 4, there is shown a system diagram of the entire anti-locking device. For purposes of simplicity, the electronic elements have been shown only in block symbols. For construction details see Federal Republic of Germany Pat. No. 31 19 144. Furthermore, for the front brake circuit the pressure modulator of FIG. 3 is illustrated and for the rear brake circuit the pressure modulator modified with piezoquartz element 4a, are shown in stylized form. However, their manners of operation are essentially the same so that they are interchangeable with each other. The following description refers to the front brake circuit. Corresponding parts of the rear brake circuit are provided with the subscript "a".

Speed sensor 82 monitors the speed of vehicle wheel 92 and supplies a digital electric signal which corresponds to angular speed. Signal processor 10 converts this digital signal to an analog signal and generates the other signals necessary for regulating braking pressure. Subsequent limiter 20 serves to provide assurance that even if wheel 92 suddenly stops, threshold discriminator 30 will receive an input signal and regulation of braking pressure will occur.

Threshold discriminator 30 responds particularly to circumferential decelerations of 12 m/s² and 10 m/s². When the upper deceleration threshold is reached, discriminator 30 delivers a signal to set point value guider 40 which acts on comparator 17 with a continuously increasing voltage signal. A voltage signal from position measuring system 4 or force measuring member 4a is also supplied to comparator 17. As long as there is a difference between the measured actual value and the set point value, a signal appearing at the output of comparator 17 brings about energization of coil 12 of electromagnet 5 and braking pressure is reduced as chamber 14 expands after inlet 95 is closed by valve 3.

By reducing the active braking force, the circumferential deceleration of wheel 92 goes lower until reaching the lower threshold of 10 m/s². At this point, threshold discriminator 30 generates a voltage signal that is fed to operator 50 in order to further decrease the braking force by an amount calculated precisely from the circumferential moment of inertia whereupon deceleration increases again up to the upper circumferential deceleration threshold of 12 m/s², at which point a new braking control cycle commences. The pressure reduction phase can be followed immediately by the pressure increase phase, as indicated at 40a, or the pressure increase phase can take place only after a constant phase, as indicated at 40. It is possible to obtain very high-frequency control cycles, as a result of which optimum braking is obtained. Regulation takes place until the vehicle has come to a stop or until braking pressure present from master cylinder 94 on pressure modulator 1 is below the pressure which would lead to a locking of wheel 92.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method of controlling a spatially closed anti-locking hydraulic braking system for an automotive vehicle, which system includes wheel cylinder means and an expandable chamber connected in a spatially closed arrangement, an operator-controlled master cylinder, said chamber being coupled to a transmission means constructed to convert an input force/displacement stroke to a force-displacement stroke of substantially greater linearity, and said expandable chamber being interposed between the master cylinder and the wheel cylinder means; said method being comprised of:

increasing master cylinder pressure and measuring wheel deceleration;

and when said wheel deceleration reaches an upper threshold, energizing an electromagnet to operate its armature through a working stroke which is effective to isolate the chamber from the master cylinder and expand the volume of said chamber via said transmission means to reduce braking pressure at the wheel cylinder at a substantially linear rate.

2. A method as set forth in claim 1, in which energization of the magnet when deceleration reaches the upper threshold is controlled by a closed electronic circuit.

3. A spatially closed anti-locking hydraulic braking system for an automotive vehicle supported on wheels, said system including:

an operator-controlled master cylinder, wheel cylinder means, brake means operated by said wheel cylinder means, an expandable chamber connected in spatially closed relationship with said wheel cylinder means, with said chamber interposed between said master cylinder and said wheel cylinder means, and a valve for isolating said chamber from said master cylinder;

a speed of rotation sensor for measuring speed of rotation of a vehicle wheel and generating an electrical speed of rotation signal;

an evaluation circuit processor which differentiates said speed of rotation signal and generates a signal to decrease braking pressure exerted by said wheel cylinder means when a first rotational deceleration threshold is reached, and upon reaching a second rotational deceleration threshold, less than said first threshold, generating a signal to terminate decreasing of said braking pressure;

a change of speed limiter fed by the processor and, which determines when the second rotational deceleration threshold is reached, an electronic image of braking pressure present at that time and reduces braking pressure again by an amount which is calculated as a function of momentum for a vehicle wheel;

an electromagnet controlled by said processor and including a movable armature that operates with a non-linear force/displacement characteristic;

a variable lever transmission through which movement of said armature is transmitted to said chamber to controllably vary its volume;

said transmission being operatively constructed so that a non-linear force/displacement stroke applied to said transmission is converted to a force/displacement stroke of substantially greater linearity that is utilized to control the volume of the chamber.

4. A braking system as set forth in claim 3, also including biasing means which automatically closes the valve to isolate the chamber from the master cylinder when volume of said chamber reaches a predetermined value.

5. A braking system as set forth in claim 4, also including a comparator, and means responsive to volume of said chamber for generating a signal fed to said comparator where the latter signal is compared with a set point signal also fed to said comparator.

6. A braking system as set forth in claim 5, in which the means responsive to the volume of said chamber comprises a pressure sensitive piezoquartz element.

* * * * *